Feb. 20, 1951 — U. A. MOORES — 2,542,555
SEED GERMINATING AND PLANTING APPARATUS
Filed March 18, 1948 — 2 Sheets-Sheet 1
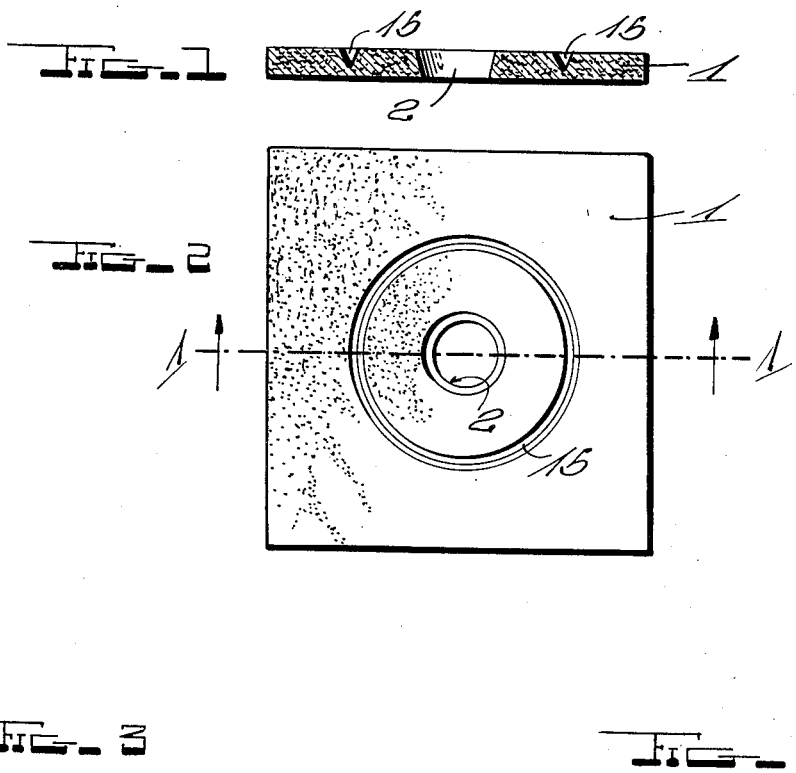
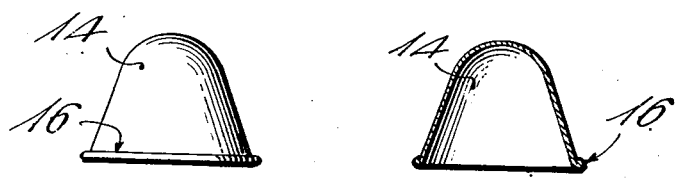
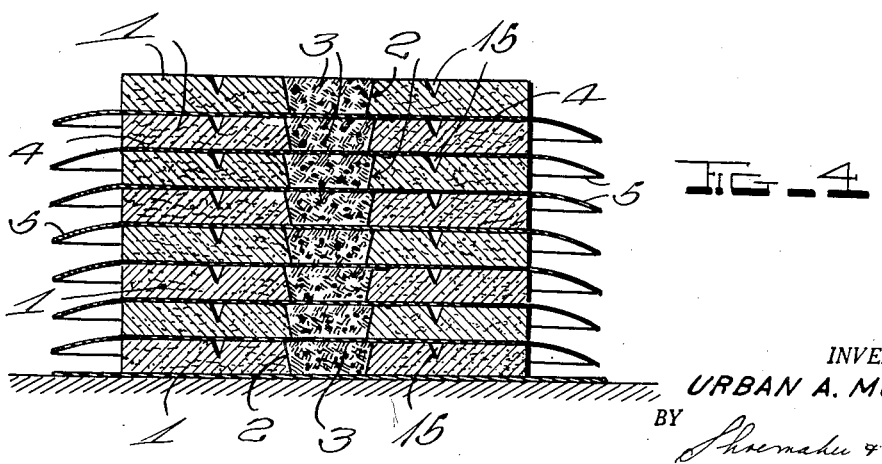
INVENTOR.
URBAN A. MOORES,
BY Shoemaker & Mattare
ATTORNEYS

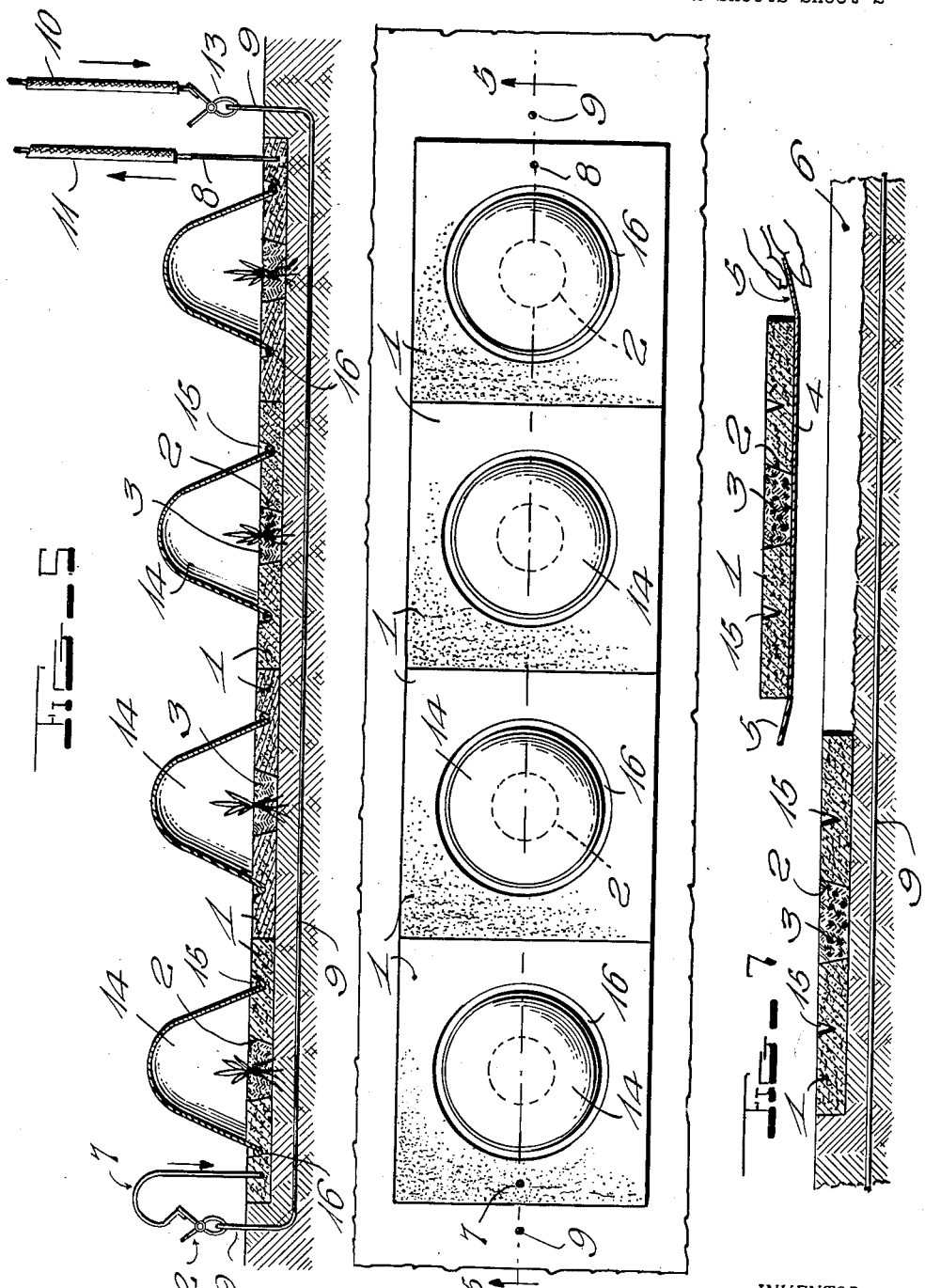

Patented Feb. 20, 1951

2,542,555

UNITED STATES PATENT OFFICE 2,542,555

SEED GERMINATING AND PLANTING APPARATUS

Urban A. Moores, Mechanic Falls, Maine

Application March 18, 1948, Serial No. 15,528

5 Claims. (Cl. 47—19)

This invention relates to improved apparatus for germinating and planting seed.

An important object of the invention is to provide an improved seed germinating and planting block which will have sufficient strength and rigidity to retain its shape in handling and having an inner central relatively soft seed receiving section especially favorable for promoting rapid sprouting of the seed and growth of the plant.

Another object of the invention is to provide for the easy rapid handling of the blocks in the introduction of soft loam into the central chambers of the blocks, the planting of the seed therein, in the piling of the blocks in tiers in the warehouse and in transferring the blocks from the warehouse to the soil.

The invention comprehends a multiplicity of seed germinating blocks of the character referred to of uniform size and shape, planted in the soil to a depth equal the thickness of the blocks and arranged close together side by side in continuous rectangular formation so that the same will act as a mulch to prevent the growth of weeds in the soil between the plants in the blocks, and a substantially weedless truck garden will be provided.

A further object of the invention is to provide in combination with a multiplicity of such blocks planted in the soil placed close together in continuous formation as referred to, electric heating means for impregnating the blocks and the soil beneath the same with electric current to heat the blocks and promote fertility of the soil.

A still further object of the invention is to provide simple, efficient means adapted to be readily applied to the blocks when planted in the soil to retain heat and moisture therein.

The invention, with other objects and advantages thereof, and the particular construction, combinations and arrangements of parts comprising the same will be understood from the following detailed description when considered in connection with the accompanying drawings forming part hereof and illustrating one embodiment of the invention.

In the drawings:

Fig. 1 is a vertical section on the line 1—1 of Fig. 2 of a seed germinating and planting block constructed in accordance with the present invention;

Fig. 2 is a top plan view of the block before the inner central chamber of the block is filled with loam;

Figs. 3 and 3A are detail views of one of the heat retaining caps;

Fig. 4 is a vertical sectional view of a plurality of blocks after the central chambers thereof have been filled with soft loam and the seed planted therein; the blocks being shown in superposed relation separated by fabric sheets as they will be arranged in a warm warehouse for a period of germination;

Fig. 5 is a vertical section on the line 5—5 of Fig. 6;

Fig. 6 is a top plan view of part of a truck garden with a row of the blocks planted therein;

Fig. 7 is a vertical section of a block planted in the soil and showing another block about to be laid adjacent thereto.

While a preferred embodiment of the invention is illustrated in the drawings, it will be understood that minor changes and modifications may be made in the particular constructions shown and the invention may be embodied in other forms as will appeal to those skilled in the art and falling within the scope of the appended claims without departing from the spirit of the invention.

Referring to a detailed description of the particular embodiment of the invention illustrated in the drawings, 1 designates a relatively small square block moulded from vegetable matter or the like. The block, which is porous and of sufficient strength and rigidity to retain its shape in handling, is formed with a central opening 2 extending through the same to provide an inner chamber of sufficient size to hold enough loam to germinate a seed, and this central chamber is filled with soft weed-free loam in which the seed is planted. The block thus provided, while capable of being handled and shipped with the plant growing therein, provides a central relatively soft area of loam 3 that is especially favorable for the rapid sprouting of the seed and growth of the plant.

The central opening 2 in the block is preferably as shown, formed with a slight downward taper, which tends to cause the loam, when tamped into the chamber, to wedge and be held therein.

In practicing the invention, many different kinds of vegetable matter and other raw materials may be utilized in making the blocks. For example, the blocks may be made of wheat straw, corn stalks, saw dust, seaweed, marsh hay, fish waste or animal manure. A preferred material from which to make the blocks is spaghnum moss, since it is fibrous enough to hold its shape when pressed into the form desired without the addition of any adhesives, and an unlimited supply of such material is available at low cost. The block may be made of the bog-moss alone or with mud and clay or ground limestone mixed therewith.

In filling the central chambers 2 of the blocks with soft loam by hand, a sheet of flexible material 4 is provided for each block, the sheet being laid on a table or bench and the block placed thereon. The sheets 4, which conveniently take the form of oil paper, are of oblong shape, slightly larger than the blocks so that with a block resting upon the sheet, there will be end portions 5 of the sheet projecting from opposite sides of the block to provide portions to be gripped whereby the sheet with the block thereon may be lifted and the blocks with the supporting sheets piled one upon another in tier formation as shown in Fig. 4 of the drawings, the sheets 4, in addition to serving as means for readily moving the blocks, providing a temporary cover over the lower ends of the inner chambers 2 of the blocks and separating the blocks from each other. The blocks thus arranged in tiers are placed in a warm room or warehouse for a period of germination, the sheets 4, while separating the blocks, not interfering with the free circulation of warm moist air into the blocks. After the seeds have sprouted, the blocks can be shipped with the plants growing therein.

In accordance with the present invention, a multiplicity of blocks 1 are planted in the soil close together in continuous rectangular formation to a depth equal the thickness of the block as illustrated in Fig. 5 of the drawings. The blocks with the plants therein can be readily planted in the soil by separately lifting the same from a pile of blocks by grasping the projecting end portions 5 of the sheet of oil paper beneath the uppermost block and transferring the same on the paper sheet to a shallow trench 6 in the soil, the sheet 4 being slipped from beneath the block as the block is placed in position in the trench.

The blocks, when planted in the soil, serve to enrich the soil about the plant and continue to supply food thereto. The blocks also, as arranged in the close formation described, act as a mulch to prevent the growth of weeds between the plants in the blocks so that a substantially weed-free garden is provided.

Electric means is provided for impregnating the blocks and underlying soil with electric current to heat the same and supply warmth to the plants. The means for this purpose includes electrodes 7 and 8 inserted in the blocks at each end of a row of blocks, a high resistance wire 9 imbedded in the soil beneath the row of blocks connected at one end with the electrode 7, and conductors 10 and 11 leading respectively from the other end of the high resistance wire 9 and the electrode 8 to a suitable source of electric current supply (not shown). The electrode 7 is shown provided at one end with a clamp 12 detachably connecting the same to one end of the imbedded resistance wire 9. A similar clamp 13 is shown on conductor 10 for detachably connecting it to the other end of the imbedded wire 9. A rheostat (not shown) of conventional form is also provided in the circuit for regulating the current supply to the electrodes and the high resistance wire. It will be understood that, while only one pair of electrodes and a single imbedded high resistance wire is shown in the drawings, as many pairs of electrodes and high resistance wires imbedded in the soil beneath the blocks may be employed as found desirable to meet different conditions, the invention contemplating the provision of such soil electrifying and heating equipment for each row of the blocks.

A heat retaining cap 14 is also provided for each of the blocks 1 to fit on the upper side thereof and form an enclosure thereabout. Each of the blocks is provided in its upper face with an annular groove 15 concentric with the central inner loam-filled chamber 2 of the block. The lower ends of the caps 14 seat in the grooves 15 of the blocks, the grooves serving as means for readily centering the heat retaining caps on the blocks and to retain the same in position thereon. The heat retaining caps, which may be constructed of any suitable material, are of general inverted cup shape form with a bead 16 at their lower ends as shown and, when not in use, can be compactly arranged in nested relation.

What is claimed is:

1. A seed germinating and planting means including a moulded block of vegetable matter or the like, said block being porous and having a central opening extending vertically through the same from top to bottom providing a chamber large enough for holding a sufficient amount of loam to germinate seeds, said block having in its upper face an annular groove concentric with said central opening to receive therein the lower end of a heat retaining cap member.

2. Seed germinating and planting means comprising a flat molded block of vegetable matter or the like adapted to be planted in the soil, said block being porous and of sufficient strength and rigidity to retain its shape in handling, the block being of small thickness and having a relatively large opening extending vertically through the same inwardly of its marginal edge portion, the area of said opening being such as to provide a shallow chamber large enough for holding a sufficient amount of loam to have seed embedded therein and to germinate the seed, the seed planted in the loam held in the shallow chamber being located near the soil beneath the block when the block is planted in the soil.

3. Seed germinating and planting means comprising a flat molded block of vegetable matter or the like adapted to be planted in the soil, said block being porous and of sufficient strength and rigidity to retain its shape in handling, the block being of small thickness and having a relatively large opening extending vertically through the same inwardly of its marginal edge portion, the area of said opening being such as to provide a shallow chamber large enough for holding a sufficient amount of loam to have seed embedded therein and to germinate the seed, the seed planted in the loam held in the shallow chamber being located near the soil beneath the block when the block is planted in the soil, the chamber in the block being filled with relatively soft loam.

4. Seed germinating and planting means comprising a flat molded block of vegetable matter or the like adapted to be planted in the soil, said block being porous and of sufficient strength and rigidity to retain its shape in handling, the block being of small thickness and having a relatively large downwardly tapering opening extending vertically through the same inwardly of its marginal edge portion, the area of said opening being such as to provide a shallow chamber large enough for holding a sufficient amount of loam to have seed embedded therein and to germinate the seed, the seed planted in the loam held in the shallow chamber being located near the soil beneath the block when the block is planted in the soil.

5. Seed germinating and planting means including a flat molded block of vegetable matter or the like, said block being porous and of sufficient strength and rigidity to retain its shape in handling, the block having an opening extending vertically through the same inwardly of its marginal edge portion providing a chamber large enough for holding a sufficient amount of loam to germinate seed, and a sheet of flexible material of a size to support said block resting flat thereupon with portions of the sheet projecting from opposite marginal edge portions of the block to be grasped in placing the block upon or removing it from another similar block, said sheet serving as a temporary covering for the lower end of the chamber in the block and to separate the lower end of the chamber of the block from the upper end of the chamber of a similar block when a plurality of such blocks are arranged in a tier.

URBAN A. MOORES.

REFERENCES CITED

The following references are of record in the file of this patent:

UNITED STATES PATENTS

| Number | Name | Date |
| --- | --- | --- |
| 1,486,431 | Harvey | Mar. 11, 1924 |
| 1,912,300 | Parks | May 30, 1933 |
| 1,988,307 | Fay | Jan. 15, 1935 |
| 2,243,857 | Fischer | June 3, 1941 |